June 11, 1929.    J. KENNEDY ET AL    1,716,780
PAN LIFTER
Filed Aug. 24, 1927
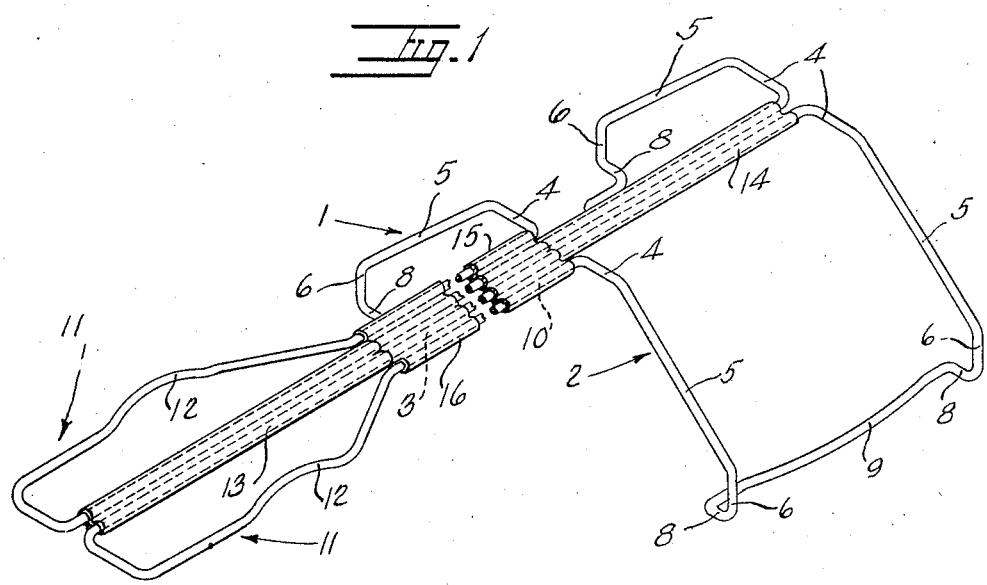
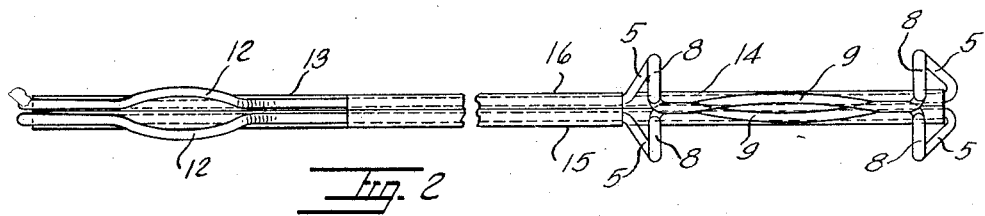
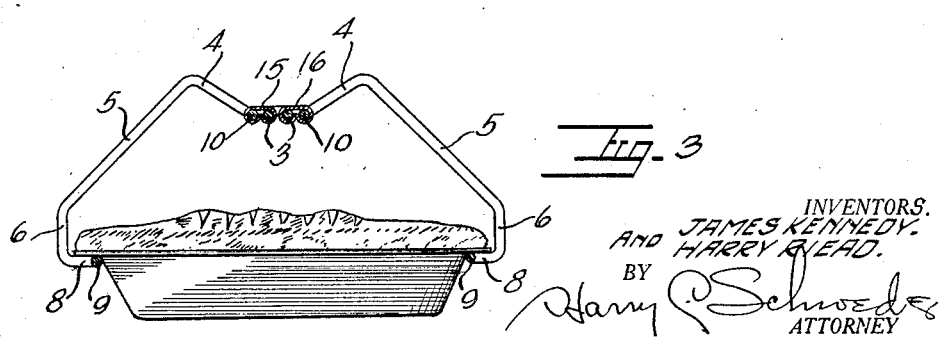
INVENTORS.
JAMES KENNEDY.
AND HARRY READ.
BY
ATTORNEY Patented June 11, 1929.

1,716,780

UNITED STATES PATENT OFFICE.

JAMES KENNEDY AND HARRY RIEAD, OF HOLLYWOOD, CALIFORNIA.

PAN LIFTER.

Application filed August 24, 1927. Serial No. 215,104.

The invention forming the subject matter of this application relates to pan lifters, particularly to pan lifters adapted to be used in connection with pans containing pies, the crust of which slightly extends over the rim of the pan.

The principal object of the invention is to provide a pan lifter which can be manipulated by one hand and by which the gripping of a hot pan can be effected without any danger of dropping the pan or the contents thereof.

Another object of the invention is to provide a pan lifter, the gripping arms of which are so shaped as to obviate any danger of hurting or damaging the contents of the pan.

The pan lifter is particularly adapted to eliminate all possibilities of crushing the crust of a pie baked in said pan when the pan is lifted.

The above and other objects in view will more readily appear as the description proceeds. The preferred embodiment of the invention is clearly illustrated in the accompanying drawing, in which:

Figure 1 is a perspective view of the pan lifter,

Figure 2 is a front view of the pan lifter, showing the same closed,

Figure 3 is a sectional view showing the pan lifter in gripping position.

In carrying out our invention we make use of a rod 1 and another rod 2, said rods 1 and 2 to be disposed in parallelism with each other. As the shapes of the rods 1 and 2 after bending are symmetrical it will be sufficient to describe the shape of one of the rods.

The rod 1 has a straight portion 3 extending throughout the full length of the pan lifter. One end of the rod 1 at the extremity of the straight portion 3 is turned and bent laterally and upwardly as at 4. A downward sloping gripping arm 5 is then formed, the end of which is rebent as at 6. The rebent portion 6 is substantially at right angles to the rim of the pan in the gripping position of the pan lifter. The length of the portion 6 is such as to permit the end of the gripping arm 5 to clear the crust of the pie disposed in a pan 7 as shown in Figure 3. A holder 8 is formed at the end of the portion 6 forming one end of a longitudinally extending curved holding portion 9 terminated at the other end thereof by a similar shoulder 8 and bent portion 6. The rod is bent further in to another gripping arm 5 substantially parallel with the first gripping arm 5 having another laterally bent portion 4 at the end of which the rod is bent to form another straight portion 10 parallel with and adjacent to the straight portion 3.

A loop 11 is formed at the extremity of the rod by returning portion 10 being bent and rebent into continuation with the long straight portion 3. The loop has a curve bent therein as at 12 for the purpose to be hereinafter described.

The two rods are placed side by side so that the long straight portions 3 are adjacent and parallel with each other. A double sleeve 13 made of a single sheet of metal is bent around the adjacent straight portions 3 inside of the loop 11 so as to provide a separate bearing for each of the straight portions 3 of the rods 1 and 2 respectively. A similar double sleeve 14 is similarly bent or crimped over the straight portions 3 disposed between the gripping arms 5. Double bearing sleeves 15 and 16 are disposed side by side so as to provide separate bearings for the straight portions 3 and the respective shorter straight portions 10 of the same rods 1 and 2 respectively.

In order to grip the pan 7 the pan lifter is held in the hand of the operator so that the palm of the hand rests upon the double sleeve bearing 13. The pan lifter is now in closed position as shown in Figure 2. The opening of the pan lifter is effected by inserting the index finger into the opening formed by the curved portions 12, then by exerting a lateral pressure in the opening and aiding the thumb the straight portions 10 are turned apart around the straight portions 3 in the sleeves 15 and 16. It is apparent from Figure 1 that the sleeves 15 and 16 are so disposed as to pivotally support the straight portions 10 around the straight portions 3, but when the loops 11 are separated and turned apart from each other around the pivotal straight portions 3 in the sleeves 14 the portions 10 also rotate turning the sleeves 15 and 16, thereby parting the curved holding portions 9 to a distance sufficiently large to permit the placing of same below the rim of the pan 7. After the curved holding portions 9 are below the rim of the pan 7 then by pressing the loops 11 toward each other, said curved portions 9 are also pressed against the wall of the pan 7 below the rim thereof, thereby firmly gripping the same. In order to remove the pan lifter the handle loops 11 are again turned apart until the holding portions 9 clear the rim of the pan.

It is evident from the aforesaid description that the pan lifter illustrated in the drawing is very economically constructed. It eliminates the common trouble of damaging the pie-crust in the pan when the same is removed from one place to the other.

Having thus described our invention what we now claim as novel and desire to secure by Letters Patent is:

1. A pan lifter comprising a pair of parallel and adjacent rods each of said rods being bent at one end into laterally projecting gripping arms, supporting shoulders formed at the edges of the gripping arms and a bent clearance portion between the gripping arms and said shoulders for spacing said arms from said shoulders, handle means formed on each rod by bending the other end thereof and sleeves embracing the adjacent straight portions of said rods to secure the same together in turnable relation to each other.

2. The combination with a pan having a rim thereon of a pan lifter comprising a pair of rods the straight portions of which are adjacent and parallel, laterally projecting gripping arms formed by bending one end of each rod, shoulders formed by rebending said gripping arms, a curved holding member between said shoulders, said shoulders and holding members to engage the pan below the rim, clearance portions formed by bending upwardly said rods between each shoulder and each gripping arm, so as to space said gripping arms from the rim of the pan, bent and rebent portions at the other end of said straight portion, forming handle means and a plurality of double bearing sleeves for securing said straight portions to each other in turnable relationship.

3. The combination with a pan having a rim thereon of a pan lifter comprising a pair of rods the straight portions of which are adjacent and parallel, laterally projecting gripping arms formed by bending one end of each rod, shoulders formed by rebending said gripping arms, a curved holding member between each pair of said shoulders, said shoulders and holding member to engage the pan below the rim, clearance portions formed by bending upwardly said rods between each shoulder and each gripping arm, so as to space said gripping arms from rim of the pan, bent and rebent portions at the other end of said straight portion forming handle means, a second straight portion on each rod connecting each gripping arm, and each handle means, first sets of double bearing sleeves disposed between the handle means and between the gripping arms, securing the adjacent straight portions of said rods together in turnable relationship and a second set of double bearing sleeves disposed on the central portions of each rod to secure one straight portion of each of said rods to the other straight portion of the same rod in turnable relationship.

4. The combination with a pan having a rim thereon of a pan lifter comprising a pair of rods the straight portions of which are adjacent and parallel, laterally projecting gripping arms formed by bending one end of each rod, shoulders formed by rebending said gripping arms, a curved holding member between said shoulders, said shoulders and holding members to engage the pan below the rim, clearance portions formed by bending upwardly said rods between each shoulder and each gripping arm, so as to space said gripping arms from rim of the pan, bent and rebent portions at the other end of said straight portion forming handle means, a second straight portion on each rod connecting each gripping arm and each handle means, first sets of double bearing sleeves disposed between the handle means and between the gripping arms, securing the adjacent straight portions of said rods together in turnable relationship and a second set of double bearing sleeves disposed on the central portions of each rod to secure one straight portion of each of said rods to the other straight portion of the same rod in turnable relationship, the loop of said handle portions to have curvatures bent therein opposite each other to form an opening between the adjacent handle means, when folded.

In testimony whereof we affix our signatures.

JAMES KENNEDY.
HARRY RIEAD.